(12) United States Patent
Sakai et al.

(10) Patent No.: US 7,763,340 B2
(45) Date of Patent: Jul. 27, 2010

(54) DUST-PROOF, LIGHT-TRANSMITTING MEMBER AND ITS USE, AND IMAGING APPARATUS COMPRISING SAME

(75) Inventors: Yasuhiro Sakai, Saitama (JP); Kazuhiro Yamada, Saitama (JP); Hiroyuki Nakayama, Tokyo (JP); Maki Yamada, Saitama (JP)

(73) Assignee: Hoya Corporation, Tokyo (JP)

( * ) Notice: Subject to any disclaimer, the term of this patent is extended or adjusted under 35 U.S.C. 154(b) by 672 days.

(21) Appl. No.: 11/617,068

(22) Filed: Dec. 28, 2006

(65) Prior Publication Data

US 2007/0153385 A1 Jul. 5, 2007

(30) Foreign Application Priority Data

Jan. 5, 2006 (JP) .................... P2006-000921

(51) Int. Cl.
*B32B 7/02* (2006.01)
(52) U.S. Cl. .................. 428/141; 428/409; 359/507
(58) Field of Classification Search ............. 359/507; 428/141–142, 409
See application file for complete search history.

(56) References Cited

U.S. PATENT DOCUMENTS

| | | | |
|---|---|---|---|
| 7,006,138 B2 | 2/2006 | Kawai | |
| 2002/0068156 A1* | 6/2002 | Suzuki et al. | 428/208 |
| 2003/0202114 A1 | 10/2003 | Takizawa et al. | |
| 2003/0214599 A1 | 11/2003 | Ito et al. | |
| 2005/0088563 A1 | 4/2005 | Ito et al. | |
| 2005/0233113 A1 | 10/2005 | Kotani et al. | |
| 2005/0280712 A1 | 12/2005 | Kawai | |
| 2006/0154044 A1 | 7/2006 | Yamada et al. | |
| 2006/0239886 A1 | 10/2006 | Nakayama et al. | |
| 2006/0281828 A1 | 12/2006 | Nakayama et al. | |

FOREIGN PATENT DOCUMENTS

| | | |
|---|---|---|
| CN | 1661398 | 8/2005 |
| EP | 1086971 | 3/2001 |
| JP | 7-126552 | 5/1995 |
| JP | 9-202649 | 8/1997 |
| JP | 9-202650 | 8/1997 |
| JP | 9-202651 | 8/1997 |
| JP | 09202650 A * | 8/1997 |
| JP | 11-228631 | 8/1999 |
| JP | 11-337706 | 12/1999 |
| JP | 2001-298640 | 10/2001 |
| JP | 2002-204379 | 7/2002 |
| JP | 2003-319222 | 11/2003 |

(Continued)

OTHER PUBLICATIONS

English Language Abstract of JP 2001-298640.

(Continued)

*Primary Examiner*—Alessandro Amari
*Assistant Examiner*—Mark Consilvio
(74) *Attorney, Agent, or Firm*—Greenblum & Bernstein, P.L.C.

(57) ABSTRACT

A dust-proof, light-transmitting member disposed on a light-receiving surface of an imaging device, comprising a light-transmitting substrate, at least a light-entering surface of which is provided with a dust-proof coating having fine roughness on the surface.

12 Claims, 5 Drawing Sheets

FOREIGN PATENT DOCUMENTS

| | | |
|---|---|---|
| JP | 2005-234447 | 9/2005 |
| JP | 2005-262471 | 9/2005 |
| JP | 2005-275372 | 10/2005 |

OTHER PUBLICATIONS

English Language Abstract of JP 2002-204379.
English Language Abstract of JP 2003-319222.
English Language Abstract of JP 9-202649.
English Language Abstract of JP 9-202650.
English Language Abstract of JP 9-202651.
English Language Abstract of JP 7-126552.
English Language Abstract of JP 11-228631.
English Language Abstract of JP 11-337706.
U.S. Appl. No. 11/557,569 (Yamada et al.), filed Sep. 21, 2006.
U.S. Appl. No. 11/620,805 (Yamada et al.) filed Oct. 23, 2006.
Machine English language translation of JP 2005-234447.

\* cited by examiner

DUST-PROOF, LIGHT-TRANSMITTING MEMBER AND ITS USE, AND IMAGING APPARATUS COMPRISING SAME

FIELD OF THE INVENTION

The present invention relates to a light-transmitting member having excellent dust proofness, its use, and an imaging apparatus comprising such member.

BACKGROUND OF THE INVENTION

Recently, electronic imaging apparatuses such as digital cameras, image input apparatuses (for instance, facsimiles, scanners, etc.), etc. for converting optical images to electric signals have been being widely used. In these electronic imaging apparatuses, however, foreign matter such as dust existing in light paths to the light-receiving surfaces of imaging devices such as photoelectric conversion devices (for instance, CCD), etc. is seen in the resultant images.

For instance, digital, single-lens reflex cameras with exchangeable photographing lenses have mirror boxes, into which dust, etc. are likely to enter when the photographing lenses are detached. Also, because mechanisms for controlling diaphragms of mirrors and photographing lenses work in the mirror boxes, dust is likely to be generated in the mirror boxes. In image input apparatuses such as facsimiles, scanners, etc., it is likely that foreign matter such as dust, etc. is generated while manuscripts are conveyed, or while manuscript-reading units move, and that the foreign matter is attached to the light-receiving surfaces of CCDs or platen glasses on which manuscripts are placed, etc. Thus, foreign matter attached to the surfaces of imaging devices, etc. is blown away using air-blowing means such as blowers, etc., but the blown foreign matter may remain in the equipment.

Particularly in digital cameras, optical filters for controlling space-frequency characteristics are disposed near imaging devices, and the optical filters are generally constituted by birefringent quartz plates. However, quartz having a piezoelectric function is easily charged by vibration, etc., and once charged, it is not easily deprived of electric charge. Accordingly, when foreign matter floats in cameras by vibration, airflow, etc. during camera operation, it is likely to be attached to the charged optical filters. Thus, cleaning with air-blowing means should be conducted frequently.

JP 2001-298640A proposes a digital camera containing a wiper, which cleans a light-receiving surface of CCD, a surface of a lowpass filter disposed on the side of the light-receiving surface of CCD, or a surface of the outermost optical member in a dust-proof unit sealing a light path to the light-receiving surface of CCD. JP 2002-204379A and JP 2003-319222A propose a camera comprising a sealed holder containing CCD and a lowpass filter, and having an opening covered with a dust-proof member (glass plate, etc.), and a means (piezoelectric element) for vibrating the dust-proof member. In this camera, dust is not attached to the CCD and the lowpass filter sealed in the holder, and dust attached to the dust-proof member can be removed by the vibrating means. However, the mechanical removal of dust described in JP 2001-298640A, JP 2002-204379A and JP 2003-319222A suffers such problems as high cost, weight increase in apparatuses, increased current consumption, etc.

OBJECT OF THE INVENTION

Accordingly, an object of the present invention is to provide a dust-proof, light-transmitting member having excellent dust proofness, its use, and an imaging apparatus comprising such member.

DISCLOSURE OF THE INVENTION

As a result of intense research in view of the above objects, the inventors have found that the formation of a dust-proof coating having a fine-roughness surface on at least a light-entering surface of a light-transmitting substrate provides a dust-proof, light-transmitting member with excellent dust proofness. The present invention has been completed based on such finding.

Thus, the dust-proof, light-transmitting member of the present invention, which is disposed on a light-receiving surface of an imaging device, comprises a light-transmitting substrate, at least a light-entering surface of which is provided with a dust-proof coating having fine roughness on the surface.

The dust-proof coating preferably comprises at least one selected from the group consisting of alumina, zinc oxide and zinc hydroxide. The roughness of the dust-proof coating is preferably constituted by large numbers of fine petal-shaped protrusions irregularly distributed with groove-shaped recesses existing therebetween.

The dust-proof, light-transmitting member preferably comprises an antistatic layer under the dust-proof layer, to have further improved dust adhesion resistance. The antistatic layer preferably has surface resistivity of $1 \times 10^{14}$ $\Omega$/square or less. The dust-proof, light-transmitting member preferably has a water-repellent layer with or without oil repellency on the outermost surface, to have further improved dust adhesion resistance. The water-repellent layer with or without oil repellency is preferably as thick as 0.4-100 nm.

The dust-proof, light-transmitting member according to a preferred embodiment of the present invention has a three-dimensional average surface roughness (SRa) of 1-100 nm on the outermost surface, with spectral reflectance of 3% or less to visible light, the roughness of the outermost surface having the maximum height difference (P-V) of 5-1,000 nm, and the outermost surface having a specific surface area of 1.05 or more.

The dust-proof, light-transmitting member of the present invention may be provided with a mechanical dust-removing means. The dust-proof, light-transmitting member of the present invention is useful as a lowpass filter for an imaging apparatus, and as a protective member for an imaging device.

DESCRIPTION OF THE PREFERRED EMBODIMENTS

Figure 1:
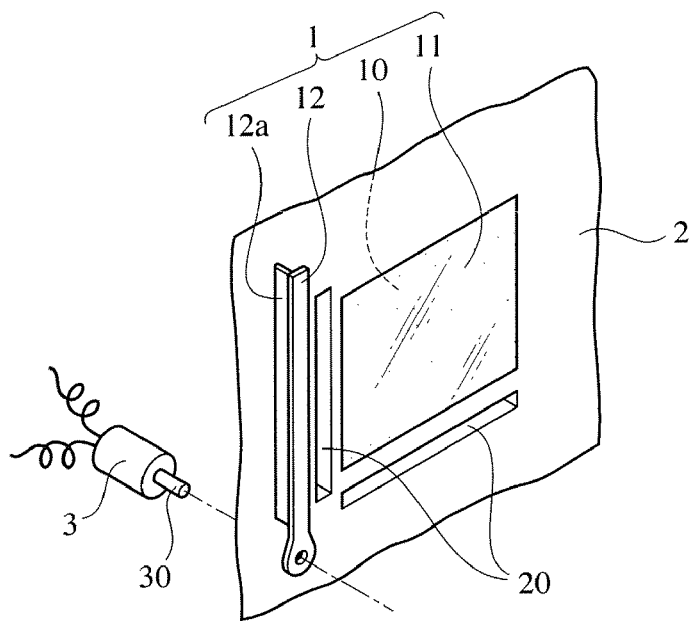
FIG. 1 is a perspective view showing one example of the dust-proof, light-transmitting members of the present invention.

[1] Layer Structure of Dust-Proof, Light-Transmitting Member

The dust-proof, light-transmitting member comprising a light-transmitting substrate, and a dust-proof coating having fine roughness on the surface, which is formed at least on a light-entering surface of the substrate. The term "dust-proof" used herein means that dust is substantially eliminated such that there are no deleterious effects to the light-transmitting member and/or the imaging apparatus.

(1) Light-Transmitting Substrate

Materials for forming the light-transmitting substrate (simply called "substrate" below, unless otherwise mentioned) may be properly selected depending on the use of the dust-proof, light-transmitting member, inorganic compounds or organic polymers. For instance, when the dust-proof, light-transmitting member is used as an optical filter (lowpass filter) for an imaging device, a substrate material is usually quartz having birefringence. When the dust-proof, light-transmitting member is used as a protective member for an imaging device or a lowpass filter, materials for the substrate may be various types of inorganic glass such as silica, borosilicate glass and soda-lime glass, transparent polymers such as polymethacrylate resins such as polymethyl methacrylate (PMMA) and polycarbonates (PC), etc. The shape and thickness of the substrate may be properly selected depending on its use.

(2) Dust-Proof Layer

The dust-proof coating has fine roughness on the surface. In general, the larger three-dimensional average surface roughness SRa, which represents the index of the surface density of fine roughness, the dust-proof coating has, the more the intermolecular force of dust particles attached to the dust-proof coating is reduced. A contact-charging adhesion force $F_1$ between uniformly charged spherical dust particles and the dust-proof, light-transmitting member is represented by the following general formula (1):

$$F_1 = -\frac{\pi \varepsilon_0 V_C^2 A^2 k^2 D^2}{457(z_0 + b)^8}, \quad (1)$$

wherein $\varepsilon_0$ is a dielectric constant (=$8.85 \times 10^{-12}$ F/m) in vacuum; Vc is the difference in contact potential between the dust-proof coating of the dust-proof, light-transmitting member and dust particles; A is a Hamaker constant, which represents van der Waals interaction; k is a coefficient represented by the formula of $k=k_1+k_2$, wherein $k_1=(1-v_1^2)/E_1$, and $k_2=(1-v_2^2)/E_2$, $v_1$ and $v_2$ are Poisson ratios of the dust-proof coating of the dust-proof, light-transmitting member and dust particles, and $E_1$ and $E_2$ are Young's moduli of the dust-proof coating of the dust-proof, light-transmitting member and dust particles; D is a dust particle diameter; $Z_0$ is distance between the dust-proof coating of the dust-proof, light-transmitting member and dust particles; b is SRa of the dust-proof coating of the dust-proof, light-transmitting member. The contact-charging adhesion force $F_1$, is generated by the difference in chemical potential. As is clear from the formula (1), the larger b (SRa of the dust-proof coating of the dust-proof, light-transmitting member) provides the smaller contact charge attraction force $F_1$.

Specifically, when the SRa of the dust-proof coating is 1 nm or more, dust particles attached to the dust-proof coating have sufficiently small intermolecular force and contact-charging adhesion force $F_1$. However, when the SRa exceeds 100 nm, light scattering occurs, making the dust-proof coating unsuitable for optical devices. Accordingly, the SRa is preferably 1-100 nm, more preferably 8-80 nm, particularly 10-50 nm. The SRa is a centerline-average roughness (arithmetic average roughness) Ra measured according to JIS B0601 using an atomic force microscope (AFM), which is three-dimensionally expanded. It is represented by the following formula (2):

$$SRa = \frac{1}{S_0} \int_{Y_B}^{Y_T} \int_{X_L}^{X_R} |F(X, Y) - Z_0| dX dY, \quad (2)$$

wherein $X_L$-$X_R$ and $Y_B$-$Y_T$ are ranges of X and Y coordinates, respectively, on the measured surface; $S_0$ is an area ($|X_R$-$X_L| \times |Y_T$-$Y_B|$) assuming that measured surface is flat; X and Y are X and Y coordinates; F (X,Y) is height at the measured point (X,Y); and $Z_0$ is average height in the measured surface.

The Hamaker constant A in the above formula (1) is approximately expressed by a function of refractive index. Thus, the smaller the refractive index, the smaller the Hamaker constant A. Specifically, regardless of whether the dust-proof coating is the outermost surface layer or covered by a water-repellent layer or a water-repellent, oil-repellent layer described below, the refractive index of the dust-proof coating is preferably 1.50 or less, more preferably 1.45 or less. Though not particularly restricted, the maximum height difference of fine roughness (P-V) in the dust-proof coating is preferably 5-1,000 nm, more preferably 50-500 nm, particularly 100-300 nm. The P-V value of 5-1,000 nm provides excellent anti-reflection characteristics, and the P-V value of 50-500 nm provides high transmittance, too. The P-V value is measured by AFM.

Though not particularly restricted, the specific surface area ($S_R$) of the dust-proof coating is preferably 1.05 or more, more preferably 1.15 or more. $S_R$ is determined by the following formula (3):

$$S_R = S/S_0 \tag{3}$$

wherein $S_0$ is an area assuming that the measured surface is flat, and S is a measured surface area. S is measured as follows. A region to be measured is divided to micro-triangles of three closest data points (A, B, C), and the area ΔS of each micro-triangle is determined by a vector product, ΔS (ΔAB C)=|AB×AC|/2, wherein AB and AC respectively represent the length of sides. ΔS is summed to obtain S. $S_R$ is preferably as large as not causing light scattering.

The dust-proof coating may be, for instance, a layer obtained by treating an alumina-containing gel layer with hot water, or a layer obtained by treating a zinc-compound-containing gel layer with a water-containing liquid at a temperature of 20° C. or higher. The former layer has surface roughness constituted by an irregular arrangement of large numbers of fine, irregularly shaped protrusions formed when a surface portion of the alumina-containing gel layer is subjected to the function of hot water, and groove-shaped recesses existing therebetween. Such protrusions are extremely fine with petal-like shapes. Unless otherwise mentioned, this layer is called "petal-shaped alumina layer" below. The latter layer has surface roughness constituted by an irregular arrangement of protrusions, which are precipitates formed when a surface portion of the zinc-compound-containing gel layer is subjected to the function of the water-containing liquid at a temperature of 20° C. or higher, and recesses existing therebetween. Such protrusions are extremely fine, though their shapes differ depending on the type of a zinc compound. Unless otherwise mentioned, this layer is called "zinc compound layer" below.

The petal-shaped alumina layer preferably comprises alumina as a main component, more preferably is composed of alumina only, and it may contain at least one optional component selected from the group consisting of zirconia, silica, titania, zinc oxide and zinc hydroxide, if necessary. The amount of the optional component added is preferably 0.01-50% by mass, more preferably 0.05-30% by mass, based on 100% by mass of the overall dust-proof coating, though not particularly restricted as long as it is within a range forming fine roughness without deteriorated transparency when the alumina-containing gel layer is treated with hot water.

The zinc compound layer is preferably composed of zinc oxide and/or zinc hydroxide as main components, more preferably composed of any one of them. The zinc compound layer may contain at least one optional component selected from the group consisting of alumina, zirconia, silica and titania, if necessary. The amount of the optional component added is preferably 0.01-50% by mass, more preferably 0.05-30% by mass, based on 100% by mass of the entire dust-proof coating, though not particularly restricted as long as it is within a range forming fine roughness without deteriorated transparency when the zinc-compound-containing gel layer is treated with a water-containing liquid at 20° C. or higher.

The roughness of the dust-proof coating can be examined, for instance, by the observation of a surface layer and/or a cross section with a scanning electron microscope (SEM) or AFM particularly in a slanting direction. The thickness of the dust-proof coating is not particularly restricted, but may be properly set depending on the use though it is preferably 0.05-3 μm. It should be noted that this thickness includes the thickness of fine surface roughness.

(3) Antistatic Layer

The dust-proof, light-transmitting member may comprise an antistatic layer on and/or under the dust-proof coating to reduce a Coulomb force, one of the causes of dust adhesion, thereby further improving the dust adhesion resistance. The antistatic layer is preferably formed under the dust-proof coating.

An electrostatic attraction force $F_2$ between uniformly charged spherical dust particles and the dust-proof, light-transmitting member is represented by the following general formula (4):

$$F_2 = -\frac{1}{4\pi\varepsilon_0} \cdot \frac{q_1 q_2}{r^2}, \tag{4}$$

wherein $q_1$, and $q_2$ are the electric charges (C) of the dust-proof coating of the dust-proof, light-transmitting member and dust particles, r is a particle radius, and $\varepsilon_0$ is a dielectric constant ($=8.85\times10^{-12}$ F/m) in vacuum. As is clear from the formula (4), charge removal by the antistatic layer is effective, because the electrostatic attraction force $F_2$ can be reduced by reducing the charges of the dust-proof coating of the dust-proof, light-transmitting member and dust particles.

An electrostatic image force $F_3$ between uniformly charged spherical dust particles and the dust-proof coating of the dust-proof, light-transmitting member is represented by the following general formula (5):

$$F_3 = -\frac{1}{4\pi\varepsilon_0} \cdot \frac{(\varepsilon-\varepsilon_0)}{(\varepsilon+\varepsilon_0)} \cdot \frac{q^2}{(2r)^2}, \tag{5}$$

wherein $\varepsilon_0$ is a dielectric constant ($=8.85\times10^{-12}$ F/m) in vacuum, $\varepsilon$ is the dielectric constant of the dust-proof coating of the dust-proof, light-transmitting member, q is the electric charge of dust particles, and r is a particle radius. When electrically charged dust particles approach the uncharged dust-proof coating of the dust-proof, light-transmitting member, the same amount of electric charge with an opposite polarity is induced in the dust-proof coating, so that $F_3$ is generated. Because the electrostatic image force $F_3$ substantially depends on the charge of dust particles, it can be reduced by removing electric charge from dust particles attached to the dust-proof, light-transmitting member by the antistatic layer.

The surface resistivity of the antistatic layer is preferably $1\times10^{14}$ Ω/square or less, more preferably $1\times10^{12}$ Ω/square or less. Though not particularly restricted, the refractive index of the antistatic layer between those of the substrate and the dust-proof coating is expected to provide higher anti-reflection effect. The thickness of the antistatic layer is not particularly restricted, but may be properly set depending on the use though it is preferably 0.01-3 μm.

Materials for the antistatic layer are not particularly restricted but may be known ones, as long as they are colorless and highly transparent. The antistatic layer may be formed, for instance, by at least one conductive inorganic material selected from the group consisting of antimony oxide, indium oxide, tin oxide, zinc oxide, tin-doped indium oxide (ITO), and antimony-doped tin oxide (ATO). The antistatic layer may be a composite layer composed of fine particles of the above conductive inorganic material (fine, conductive, inorganic particles) and a binder, or a dense layer of the above conductive inorganic material (for instance, vapor-deposited layer, etc.). The binder-forming compounds are monomers or oligomers polymerizable to binders, which may be metal alkoxides or their oligomers, ultraviolet-curable or thermally curable compounds such as acrylates, etc.

(4) Water-Repellent Layer and Water-Repellent, Oil-Repellent Layer

The dust-proof, light-transmitting member may comprise a water-repellent layer with or without oil repellency (hereinafter referred to as "water-repellent/oil-repellent layer," unless otherwise mentioned). The water-repellent/oil-repellent layer is usually formed on the outermost surface. A liquid-bridging force $F_4$ between spherical dust particles and the dust-proof, light-transmitting member is represented by the following general formula (6):

$$F_4 = -2\pi\gamma D \tag{6}$$

wherein $\gamma$ is the surface tension of a liquid, and D is a dust particle diameter. The liquid-bridging force $F_4$ is a force generated by the bridging of a liquid condensed in contact areas between the dust-proof, light-transmitting member and dust particles. Accordingly, the water-repellent/oil-repellent layer formed on the dust-proof coating suppresses water and oil from attaching, resulting in the adhesion of dust particles reduced by the liquid-bridging force $F_4$.

In general, there is a relation between the contact angle of water on a rough surface and the contact angle of water on a flat surface, which is approximated by the following formula (7):

$$\cos\theta_\gamma = \gamma \cos\theta \tag{7}$$

wherein $\theta_\gamma$ is a contact angle on a roughness surface, $\gamma$ is a surface area multiplication factor, and $\theta$ is a contact angle on a flat surface. Because $\gamma$ is usually larger than 1, $\theta_\gamma$ is smaller than $\theta$ when $\theta<90°$, and larger than $\theta$ when $\theta>90°$. Increase in a hydrophilic surface area by roughening results in enhanced hydrophilicity, and increase in a water-repellent surface area by roughening results in enhanced water repellency. Accordingly, when a water-repellent layer is formed on the dust-proof coating having fine roughness without deteriorating the roughness, high water repellency can be obtained. It is preferable that even after a water-repellent/oil-repellent layer is formed, the outermost surface keeps a three-dimensional average surface roughness (SRa), the maximum roughness height difference (P-V) and a specific surface area ($S_R$) within the above ranges.

Materials for the water-repellent/oil-repellent layer are not particularly restricted as long as they are colorless and highly transparent, and known materials can be used. They may be, for instance, fluorine-containing inorganic or organic compounds, fluorine-containing organic/inorganic hybrid polymers, fluorinated pitch (for instance, CFn, wherein n is 1.1-1.6), fluorinated graphite, etc.

The fluorine-containing inorganic compound may be, for instance, at least one selected from the group consisting of LiF, $MgF_2$, $CaF_2$, $AlF_3$, $BaF_2$, $YF_3$, $LaF_3$ and $CaF_3$. These fluorine-containing inorganic compounds are available from Canon Optron, Inc., for instance.

The fluorine-containing organic compounds may be, for instance, fluororesins, which may be polymers of fluorine-containing olefins, or copolymers of fluorine-containing olefins and monomers copolymerizable therewith. Such (co) polymers may be polytetrafluoroethylene (PTFE), tetraethylene-hexafluoropropylene copolymers (PFEP), ethylene-tetrafluoroethylene copolymers (PETFE), tetrafluoroethylene-perfluoroalkyl vinyl ether copolymers (PFA), ethylene-chlorotrifluoroethylene copolymers (PECTFE), tetrafluoroethylene-hexafluoropropylene-perfluoroalkyl vinyl ether copolymers (PEPE), polychlorotrifluoroethylene (PCTFE), polyvinylidene fluoride (PVDF), polyvinyl fluoride (PVF), etc. The fluororesins may be polymers of commercially available fluorine-containing compositions, which may be, for instance, "OPSTAR" available from JSR Corporation, "CYTOP" available from Asahi Glass Co., Ltd., etc.

The fluorine-containing organic/inorganic hybrid polymers may be organic silicon polymers containing fluorocarbon groups, which may be polymers obtained by the hydrolysis of fluorine-containing silane compounds having fluorocarbon groups. The fluorine-containing silane compounds may be compounds represented by the following formula (8):

$$CF_3(CF_2)_a(CH_2)_2SiR_bX_c \tag{8}$$

wherein R is an alkyl group, X is an alkoxyl group or a halogen atom, a is an integer of 0-7, b is an integer of 0-2, c is an integer of 1-3, and b+c=3. Specific examples of the compounds represented by the formula (8) include $CF_3(CH_2)_2Si(OCH_3)_3$, $CF_3(CH_2)_2SiCl_3$, $CF_3(CF_2)_5(CH_2)_2Si(OCH_3)_3$, $CF_3(CF_2)_5(CH_2)_2SiCl_3$, $CF_3(CF_2)_7(CH_2)_2Si(OCH_3)_3$, $CF_3(CF_2)_7(CH_2)_2SiCl_3$, $CF_3(CF_2)_7(CH_2)_3SiCH_3(OCH_3)_2$, $CF_3(CF_2)_7(CH_2)_2SiCH_3Cl_2$, etc. Commercially available organic silicon polymers may be used, which include, for instance, Novec EGC-1720 available from Sumitomo 3M Ltd., XC98-B2472 available from GE Toshiba Silicone Co., Ltd., etc.

The water-repellent/oil-repellent layer is as thick as preferably 0.4-100 nm, more preferably 10-80 nm. With the water-repellent/oil-repellent layer as thick as 0.4-100 nm, the dust-proof coating can have SRa, P-V and $S_R$ in the above ranges. Thus, the formation of the water-repellent/oil-repellent layer as thick as 0.4-100 nm on the outermost surface further improves dust adhesion resistance by the reduction of an electrostatic attraction force $F_2$ and an electrostatic image force $F_3$, in addition to the reduction of an intermolecular force and a contact-charging-attaching force $F_1$, by the fine roughness of the dust-proof coating. When the thickness of the water-repellent/oil-repellent layer is lower than 0.4 nm, sufficient water/oil repellency cannot be obtained, failing to achieve the reduced electrostatic image force $F_3$ expected when the fluororesins, for instance, are used. On the other hand, when the thickness of the water-repellent/oil-repellent layer is more than 100 nm, the water-repellent/oil-repellent layer absorbs the fine roughness of the dust-proof coating, resulting in reduced dust adhesion resistance. The refractive index of the water-repellent/oil-repellent layer is preferably 1.5 or less, more preferably 1.45 or less.

(5) Examples of Layer Structures

Preferred examples of the layer structure of the dust-proof, light-transmitting member include, for instance, dust-proof coating/substrate, dust-proof coating/antistatic layer/substrate, water-repellent/oil-repellent layer/dust-proof coating/antistatic layer/substrate, dust-proof coating/substrate/dust-proof layer, dust-proof coating/antistatic layer/substrate/antistatic layer/dust-proof layer, water-repellent/oil-repellent layer/dust-proof coating/antistatic layer/substrate/antistatic layer/dust-proof coating/water-repellent/oil-repellent layer, etc., though not restrictive.

[2] Production of Dust-Proof, Light-Transmitting Member (1) Formation of Dust-Proof Layer (a) Method of Forming Petal-Shaped Alumina Layer A coating liquid comprising an aluminum compound is applied to a substrate to form a alumina-containing gel layer, which is then treated with hot water to obtain a petal-shaped alumina layer. This method is usable on a plastic substrate having no sufficient heat resistance, because it can form the petal-shaped alumina layer without a baking step at a high temperature.

The aluminum compounds may be aluminum alkoxides, aluminum nitrate, aluminum sulfate, etc., preferably aluminum alkoxides. The formation of the petal-shaped alumina layer using aluminum alkoxides is described in, for instance, JP 9-202649A, JP 3688042B and JP 9-202651A. According to these methods, a coating liquid comprising aluminum alkoxide, a stabilizing agent and water is applied to a substrate to form an alumina gel layer by a sol-gel method, and the alumina gel layer is treated with hot water to obtain the petal-shaped alumina layer. The formation of the petal-shaped alumina layer by using aluminum alkoxide will be explained in detail below.

The aluminum alkoxides may be, for instance, aluminum trimethoxide, aluminum triethoxide, aluminum triisopropoxide, aluminum tri-n-butoxide, aluminum tri-sec-butoxide, aluminum tri-tert-butoxide, aluminum acetylacetate, oligomers obtained by their partial hydrolysis, etc.

When the petal-shaped alumina layer comprises the above optional component, at least one optional-component-forming material selected from the group consisting of zirconium alkoxides, alkoxysilanes, titanium alkoxides and zinc compounds is added to the coating liquid.

The zirconium alkoxides may be, for instance, zirconium tetramethoxide, zirconium tetraethoxide, zirconium tetra-n-propoxide, zirconium tetraisopropoxide, zirconium tetra-n-butoxide, zirconium tetra-t-butoxide, etc.

The alkoxysilanes may be represented by the general formula (9) of $Si(OR_1)_x(R_2)_{4-x}$. In the general formula (9), $R_1$ is preferably an alkyl group having 1-5 carbon atoms or an acyl group having 1-4 carbon atoms, for instance, a methyl group, an ethyl group, an n-propyl group, an i-propyl group, an n-butyl group, a sec-butyl group, a tert-butyl group, an acetyl group, etc. $R_2$ is preferably an organic group having 1-10 carbon atoms, for instance, unsubstituted hydrocarbon groups such as a methyl group, an ethyl group, an n-propyl group, an i-propyl group, an n-butyl group, a tert-butyl group, an n-hexyl group, a cyclohexyl group, an n-octyl group, a tert-octyl group, an n-decyl group, a phenyl group, a vinyl group, an allyl group, etc., or substituted hydrocarbon groups such as a γ-chloropropyl group, a $CF_3CH_2$— group, a $CF_3CH_2CH_2$— group, a $C_2F_5CH_2CH_2$— group, a $C_3F_7CH_2CH_2CH_2$— group, a $CF_3OCH_2CH_2CH_2$— group, a $C_2F_5OCH_2CH_2CH_2$— group, a $C_3F_7OCH_2CH_2CH_2$— group, a $(CF_3)_2CHOCH_2CH_2CH_2$— group, a $C_4F_9CH_2OCH_2CH_2CH_2$— group, a 3-(perfluorocyclohexyloxy)propyl group, a $H(CF_2)_4CH_2OCH_2CH_2CH_2$— group, a $H(CF_2)_4CH_2CH_2CH_2$— group, a γ-glycidoxypropyl group, a γ-mercaptopropyl group, a 3,4-epoxy cyclohexyl ethyl group, a γ-methacroyloxypropyl group, etc. x is preferably an integer of 2-4.

The titanium alkoxides may be, for instance, tetramethoxy titanium, tetraethoxy titanium, tetra-n-propoxy titanium, tetraisopropoxy titanium, tetra-n-butoxy titanium, tetraisobutoxy titanium, etc.

The zinc compounds may be, for instance, zinc acetate, zinc chloride, zinc nitrate, zinc stearate, zinc oleate, zinc salicylate, etc. Among them, zinc acetate and zinc chloride are preferable.

The ratio of the optional-component-forming material to the total amount (100% by mass) of the aluminum alkoxide and the optional-component-forming material is preferably 0.01-50% by mass, more preferably 0.05-30% by mass.

The stabilizing agents preferably added to the coating liquid are, for instance, β-diketones such as acetylacetone, ethyl acetoacetate, etc.; alkanolamines such as monoethanolamine, diethanolamine, triethanolamine, etc.; metal alkoxides, etc.

The coating liquid may contain a solvent. The usable solvents may be, for instance, methyl alcohol, ethyl alcohol, propyl alcohol, butyl alcohol, methyl Cellosolve, ethyl Cellosolve, etc.

The preferred formulation by mol of the metal alkoxide, the solvent, the stabilizing agent and water is (aluminum alkoxide+optional-component-forming material)/solvent/stabilizing agent/water of 1/(10-100)/(0.5-2)/(0.1-5).

The coating liquid may contain a catalyst for accelerating the hydrolysis of an alkoxyl group and dehydration condensation. The catalysts added may be, for instance, nitric acid, hydrochloric acid, sulfuric acid, phosphoric acid, acetic acid, ammonia, etc. The amount of the catalyst added is preferably 0.01-100% by mol of the metal alkoxide.

The coating liquid may contain a water-soluble, organic, high-molecular compound, if necessary. When the alumina gel layer obtained from the coating liquid containing the water-soluble, organic, high-molecular compound is treated with hot water, the water-soluble, organic, high-molecular compound is easily eluted from the alumina gel layer, resulting in an increased surface area of the alumina gel layer reactable with hot water. This makes it possible to form the petal-shaped alumina layer at a relatively low temperature for a short period of time. The shape of roughness of the petal-shaped alumina layer formed can be controlled by selecting the type and molecular weight of the water-soluble, organic, high-molecular compound. The water-soluble, high-molecular compounds used may be, for instance, polyvinyl pyrrolidone, polyvinyl alcohol, polymethyl vinyl ether, polyethylene glycol, polypropylene glycol, etc. The amount of the water-soluble, high-molecular compound added may be 0.1-10% by mass of alumina, when it is assumed that all the aluminum alkoxide is converted to alumina.

The coating method may be, for instance, a dipping method, a spin-coating method, a nozzle-flow-coating method, a spraying method, a reverse-coating method, a flexography method, a printing method, a flow-coating method, and their combinations. Among them, the dipping method is preferable, because it can easily control the uniformity, thickness, etc. of the resultant thin layer. The thickness of the resultant gel layer can be controlled by adjusting a withdrawing speed in the dipping method, a substrate-rotating speed in the spin-coating method, the concentration of the coating liquid, etc. The withdrawing speed in the dipping method is preferably about 0.1-3.0 mm/second.

The drying conditions of the coated layer are not particularly restrictive, but may be properly selected depending on the heat resistance of the substrate, etc. In general, the coated substrate is treated at a temperature from room temperature to 400° C. for 5 minutes to 24 hours.

The substrate provided with the alumina gel layer is treated with hot water. The temperature of the hot water is properly selected depending on the heat resistance of the substrate. When immersed in hot water, the treatment is preferably conducted at a temperature of about 50° C. to about 100° C. for about 1-240 minutes. After treated with hot water, it is preferably dried at a temperature from room temperature to 400° C., more preferably baked at a temperature of 100-400° C. The drying (baking) time is preferably 10 minutes to 24 hours. The petal-shaped alumina layer thus formed is usually colorless and highly transparent.

(b) Formation of Zinc Compound Layer

A zinc compound-containing solution or dispersion is applied to a substrate and dried to form a gel layer, which is treated with a water-containing liquid at a temperature of 20° C. or higher to obtain a zinc compound layer. Because this method forms the zinc compound layer at a relatively low temperature, it is usable on a plastic substrate having no sufficient heat resistance.

The zinc compounds used may be, for instance, zinc acetate, zinc chloride, zinc nitrate, zinc stearate, zinc oleate, zinc salicylate, etc. Among them, zinc acetate and zinc chloride are preferable. When the zinc compound layer contains the above optional component, at least one optional-component-forming material selected from the group consisting of aluminum alkoxides, zirconium alkoxides, alkoxysilanes and titanium alkoxides is added to the coating liquid.

The aluminum alkoxides, the zirconium alkoxides, the alkoxysilanes and the titanium alkoxides used may be the same as described above. The optional-component-forming material is preferably 0.01-50% by mass, more preferably 0.05-30% by mass, per the total amount (100% by mass) of the zinc compound and the optional-component-forming material.

Solvents and coating methods for forming the zinc compound layer may be the same as for forming the petal-shaped alumina layer. The formulation of the coating liquid forming the zinc compound layer is preferably (zinc compound+optional-component-forming material)/solvent=1/(10-20) by mol. The coating liquid may contain the above stabilizing agents, catalysts and water, if necessary. After coating, the zinc compound layer may be dried at room temperature for about 30 minutes, and if necessary, it may be heat-dried.

The dried gel layer is treated with the water-containing liquid at a temperature of 20° C. or higher. This treatment deflocculates a surface of the gel layer, causing the rearrangement of its structure. As a result, zinc oxide and/or zinc hydroxide or their hydrates are precipitated and grow on a surface layer of the gel layer. The term "water-containing liquid" used herein means water or a mixture of water with another solvent. Another solvent may be, for instance, alcohol. The temperature of the water-containing liquid is preferably 20-100° C. The time period of treatment with the water-containing liquid is preferably about 5 minutes to about 24 hours. The zinc compound layer thus formed is usually colorless and highly transparent.

(2) Formation of Antistatic Layer

The layer made of only a conductive inorganic material may be formed by a physical vapor deposition method such as a vacuum vapor deposition method, a sputtering method, an ion-plating method, etc., or a chemical vapor deposition method such as a thermal CVD, a plasma CVD, a photo-CVD, etc. The fine, conductive, inorganic particles-binder composite layer may be formed by a wet method such as a dip coating method, a spin-coating method, a spraying method, a roll-coating method, a screen-printing method, etc. Among them, the formation of the conductive inorganic material layer by a vapor deposition method and the formation of the fine, conductive, inorganic particles-binder composite layer by a coating method will be explained below.

(a) Vapor Deposition Method

A conductive, inorganic, vapor-depositing material is evaporated by heating in vacuum, so that it is deposited on a substrate to form a conductive inorganic material layer. Though not particularly restricted, the evaporation of the vapor-depositing material particularly may be conducted by, for instance, a method using a current-heated source, a method of ejecting electron beams by an E-type electron gun, a method of ejecting large-current electron beams by hollow cathode discharge, a laser pulse abrasion method, etc. The substrate disposed with its layer-forming surface facing the vapor-depositing material is rotated during vapor deposition. The layer can be provided with a desired thickness by properly setting the vapor deposition time, heating temperature, etc.

(b) Coating Method (i) Preparation of Slurry Containing Fine, Conductive, Inorganic Particles The fine, conductive, inorganic particles preferably have an average particle size of about 5-80 nm. When the average particle size is more than 80 nm, the resultant antistatic layer has too low transparency. And fine, conductive, inorganic particles having an average particle size of less than 5 nm are difficult to produce.

The mass ratio of the fine, conductive, inorganic particles to the binder-forming compound is preferably 0.05-0.7. When this mass ratio is more than 0.7, uniform coating is difficult, and a too brittle layer is formed. When the mass ratio is less than 0.05, the resultant layer has low conductivity.

The binder-forming compounds are preferably metal alkoxides or their oligomers, and ultraviolet or thermally curable compounds. The use of metal alkoxides or their oligomers, or ultraviolet-curable compounds makes it possible to form a binder-containing antistatic layer on a substrate having no heat resistance.

The metal alkoxides are preferably alkoxysilanes, zirconium alkoxides, titanium alkoxides and aluminum alkoxides as described above, more preferably alkoxysilanes.

The ultraviolet or thermally curable compounds may be radically polymerizable compounds, cationically polymerizable compounds, or anionically polymerizable compounds, and these compounds may be used in combination.

The radically polymerizable compounds are preferably acrylic acids or their esters, and their specific examples include (meth)acrylic acid; mono-functional (meth)acrylates such as 2-hydroxyethyl (meth)acrylate, 2-hydroxypropyl (meth)acrylate, hydroxybutyl (meth)acrylate, 2-hydroxy-3-phenoxy propyl(meth)acrylate, carboxypolycaprolactone (meth)acrylate, (meth)acrylamide, etc.; di(meth)acrylates such as pentaerythritol di(meth)acrylate, ethylene glycol di(meth)acrylate, pentaerythritol di(meth)acrylate monostearate, etc.; tri(meth)acrylates such as trimethylolpropane tri(meth)acrylate, pentaerythritol tri(meth)acrylate, etc.; polyfunctional (meth)acrylates such as pentaerythritol tetra (meth)acrylate, dipentaerythritol penta(meth)acrylate, etc.; and oligomers obtained by their polymerization.

The cationically polymerizable compounds are preferably epoxy compounds, and their specific examples include phenyl glycidyl ether, ethylene glycol diglycidyl ether, glycerin diglycidyl ether, vinyl cyclohexene dioxide, 1,2,8,9-diepoxy limonene, 3,4-epoxy cyclohexyl methyl 3',4'-epoxy cyclohexane carboxylate, and bis(3,4-epoxy cyclohexyl)adipate.

When the metal alkoxide is used as a binder-forming compound, water and a catalyst are added to slurry containing fine inorganic particles. The catalyst used may be the same as for forming the petal-shaped alumina layer. The amounts of water and the catalyst may also be the same as in the case of forming the petal-shaped alumina layer.

When the radically or cationically polymerizable compound is used as a binder-forming compound, a radical or cationic polymerization initiator is added to slurry containing fine inorganic particles. The radical polymerization initiator is a compound generating radicals by ultraviolet irradiation. Examples of the preferred radical polymerization initiators include benzyls, benzophenones, thioxanthones, benzyl dimethyl ketals, α-hydroxyalkyl phenones, hydroxyketones, aminoalkylphenones, and acyl phosphine oxides. The amount of the radical polymerization initiator added is about 0.1-20 parts by mass per 100 parts by mass of the radically polymerizable compound.

The cationic polymerization initiators used are compounds generating cations by ultraviolet irradiation. Examples of the cationic polymerization initiator may be onium salts such as diazonium salts, sulfonium salts, iodonium salts, etc. The amount of the cationic polymerization initiator added is about 0.1-20 parts by mass per 100 parts by mass of the cationically polymerizable compound.

Two or more types of fine inorganic particles and binder-forming compounds may be added to the slurry. Usual additives such as dispersants, stabilizing agents, viscosity modifiers, coloring agents, etc., may also be used in ranges not deteriorating the properties of the layer.

The concentration of the slurry affects the thickness of the layer. Examples of the solvent are alcohols such as methanol, ethanol, n-propyl alcohol, i-propyl alcohol, n-butyl alcohol, 2-butyl alcohol, i-butyl alcohol, t-butyl alcohol, etc.; alkoxyl alcohols such as 2-ethoxy ethanol, 2-butoxy ethanol, 3-methoxy propanol, 1-methoxy-2-propanol, 1-ethoxy-2-propanol, etc.; ketols such as diacetone alcohol, etc.; ketones such as acetone, methyl ethyl ketone, methyl-i-butyl ketone, etc.; aromatic hydrocarbons such as toluene, xylene, etc.; esters such as ethyl acetate, butyl acetate, etc. The amount of the solvent used is about 20-10,000 parts by mass per 100 parts by mass of the sum of the fine inorganic particles and the binder-forming compound.

(ii) Coating

The coating of the slurry containing fine, conductive, inorganic particles may be conducted as in the case of forming the petal-shaped alumina layer.

The binder-forming compound in a layer of the slurry containing fine, conductive, inorganic particles is polymerized. When the binder-forming compound is a metal alkoxide or its oligomer, the curing is conducted at a temperature of 80-400° C. for 30 minutes to 10 hours. When the ultraviolet-curable binder-forming compound is irradiated with UV of about 50-3,000 mJ/cm$^2$ using a UV irradiation apparatus, the binder-forming compound is polymerized to form a layer made of the fine, conductive, inorganic particles and the binder. The irradiation time is usually about 0.1-60 seconds, though variable depending on the layer thickness.

The solvent is evaporated from the slurry containing fine, conductive, inorganic particles. The evaporation of the solvent may be conducted by keeping the slurry at room temperature, or by heating it at about 30-100° C.

(3) Formation of Water-Repellent/Oil-Repellent Layer

The fluorine-containing inorganic compound layer can be formed by a physical vapor deposition method such as a vacuum vapor deposition method, a chemical vapor deposition method, etc. in the same manner as in the case of forming the antistatic layer except for using a fluorine-containing inorganic compound as a starting material.

A layer of a polymer obtained by the hydrolysis of the fluorine-containing silane compound may be formed in the same manner as in the case of forming the alumina gel layer from the above aluminum alkoxide by a sol-gel method, except for using the compound represented by the above formula (8) as a starting alkoxide.

The fluororesin layer can be formed by a chemical vapor deposition method or a wet method such as a coating method. The formation of the fluororesin layer by a coating method will be explained below.

(a) Preparation of Solution of Fluorine-Containing Composition

The fluororesin layer may be formed (i) by coating a substrate with a solution of a composition containing a fluorine-containing olefinic polymer and a cross-linkable compound and cross-linking the composition, or (ii) by coating a substrate with a solution of a composition containing a fluorine-containing olefin and a monomer copolymerizable therewith, etc., and polymerizing it. The methods of forming fluororesin layers by using fluorine-containing compositions are described in JP 07-126552A, JP 11-228631A, JP 11-337706A, etc.

Commercially available fluororesins and/or fluorine-containing compositions as described above may be mixed with a proper solvent. The preferred solvents are ketones such as methyl ethyl ketone, methyl i-butyl ketone, cyclohexanone, etc.; esters such as ethyl acetate, butyl acetate, etc. The concentrations of the fluorine-containing olefinic polymer and the fluorine-containing olefin are preferably 5-80% by mass.

(b) Coating

Because the fluororesin layer is formed by substantially the same method for forming the above fine inorganic particles-binder composite layer except for using the fluorine-containing composition solution, only differences will be explained below. After a layer of the fluorine-containing composition solution is formed, a cross-linking reaction or a polymerization reaction is caused. When the cross-linkable compound, the fluorine-containing olefin, etc. are thermally curable, they are preferably heated at 100-140° C. for about 30-60 minutes. When they are ultraviolet-curable, UV irradiation is conducted at about 50-3,000 mJ/cm$^2$. The irradiation time is usually about 0.1-60 seconds, though variable depending on the layer thickness.

(4) Other Treatments

Before forming each of the dust-proof layer, the antistatic layer and the water-repellent/oil-repellent layer, the substrate or an underlying layer may be subjected to a corona discharge treatment or a plasma treatment, to remove absorbed water and impurities and to activate its surface. This treatment improves the adhesion strength of layers.

[3] Dust-Proof, Light-Transmitting Member

The dust-proof, light-transmitting member according to a preferred embodiment of the present invention has the following properties.

(1) The outermost surface has a three-dimensional average surface roughness (SRa) of preferably 1-100 nm, more preferably 8-80 nm, particularly 10-50 nm.

(2) The maximum height difference of fine roughness (P-V) on the outermost surface is preferably 5-1,000 nm, more preferably 50-500 nm, particularly 100-300 nm.

(3) The outermost surface has a specific surface area ($S_R$) of preferably 1.05 or more, more preferably 1.15 or more.

The dust-proof coating having fine surface roughness as described above reduces the intermolecular force and contact-charging adhesion force $F_1$ of dust particles attached to the dust-proof, light-transmitting member of the present invention. Thus, the dust-proof, light-transmitting member of the present invention has excellent foreign matter adhesion resistance, needing no mechanical dust-removing means, and achieving the reduction in cost, weight and electric consumption of an imaging apparatus. Particularly, the dust-proof, light-transmitting member having an antistatic layer has higher foreign matter adhesion resistance, because of low electrostatic attraction force $F_2$ and electrostatic image force $F_3$ between dust particles and the dust-proof, light-transmitting member. Further, the dust-proof, light-transmitting member having a water-repellent/oil-repellent layer on the outermost surface has even higher foreign matter adhesion resistance, because of a further reduced liquid-bridging force $F_4$ between dust particles and the dust-proof, light-transmitting member.

Because the dust-proof, light-transmitting member of the present invention has fine roughness on the dust-proof coating, it has excellent anti-reflection characteristics. Specifically, the dust-proof, light-transmitting member of the present invention usually has 3% or less of spectral reflectance to visible light having a wavelength range of 380-780 nm.

[4] Mechanical Dust-Removing Means

The dust-proof, light-transmitting member may have a mechanical dust-removing means. The mechanical dust-removing means may be, for instance, a wiper, vibrating member, etc. The vibrating member may be, for instance, a piezoelectric element. FIG. 1 exemplifies a dust-proof, light-transmitting member having a wiper. In this example, a rectangular-planar-shaped, dust-proof, light-transmitting member 1 comprising a dust-proof coating 11 on a substrate 10 is fit in an opening of a digital camera body 2, and a wiper 12 is supported by a shaft 30 of a motor 3 near a corner of the dust-proof, light-transmitting member 1. When the wiper 12 is swung by the motor 3, dust swept by a wiper blade 12a enters into grooves 20, 20 disposed along the sides of the dust-proof, light-transmitting member.

Figure 2A:
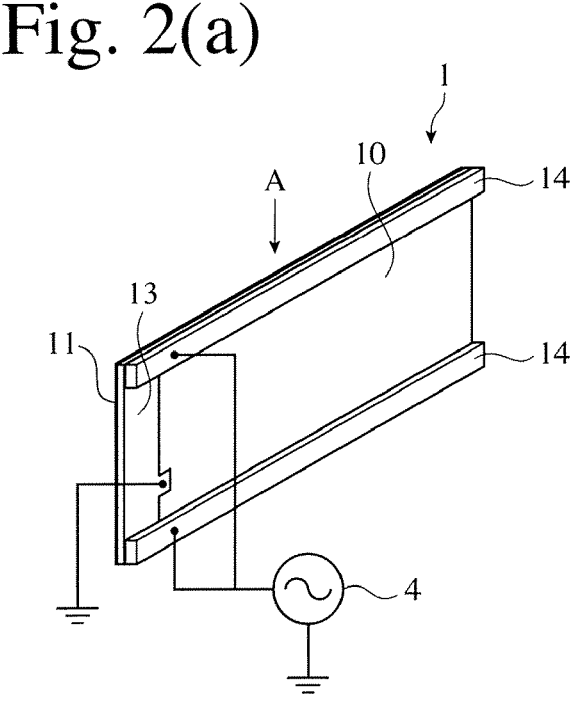
FIG. 2(a) is a perspective view showing another example of the dust-proof, light-transmitting members of the present invention.
Figure 2B:
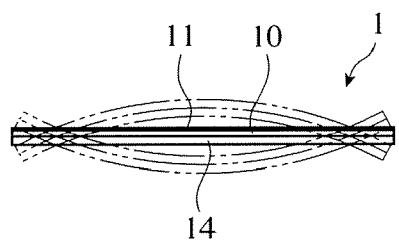
FIG. 2(b) is a plan view of the dust-proof, light-transmitting member shown in FIG. 2(a).
Figure 2C:
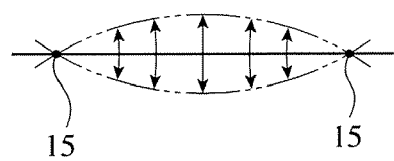
FIG. 2(c) is a schematic view showing the node of the vibration of the dust-proof, light-transmitting member shown in FIG. 2(a).

FIG. 2 shows one example of dust-proof, light-transmitting members comprising piezoelectric elements. In this example, a rectangular-planar-shaped, dust-proof, light-transmitting member 1 comprising a dust-proof coating 11 on a substrate 10 is provided with an electric terminal 13 at one longitudinal end, and piezoelectric elements 14, 14 longitudinally extend on both transverse sides of the member 1. The electric terminal 13 can be formed by the bonding, vapor-deposition, plating, etc. of a conductive material. When voltage is periodically applied to the piezoelectric elements 14, 14 by an oscillator 4 to expand and shrink the piezoelectric elements 14, 14 synchronously, as shown in FIG. 2(b), which is a view taken from A in FIG. 2(a), the dust-proof, light-transmitting member 1 undergoes bending vibration. As shown in FIG. 2(c), when the dust-proof, light-transmitting member 1 is subjected to bending vibration such that vibration nodes 15, 15 are located near both longitudinal ends of the member 1, dust attached to the dust-proof, light-transmitting member 1 can be conveyed to both longitudinal ends of the member 1. The amplitude and frequency of voltage applied may be properly set depending on the material forming the substrate 10.

Figure 3A:
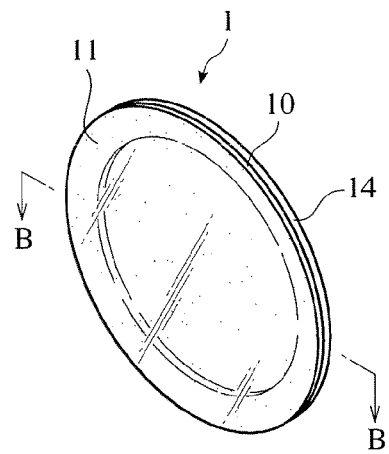
FIG. 3(a) is a perspective view showing a further example of the dust-proof, light-transmitting members of the present invention.
Figure 3B:
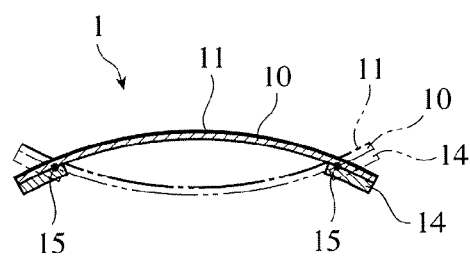
FIG. 3(b) is a cross-sectional view taken along the line B-B in FIG. 3(a).

FIG. 3 shows another example of dust-proof, light-transmitting members having piezoelectric elements. This dust-proof, light-transmitting member 1 comprises a flat, planar, annular piezoelectric element 14 on a dust-proof coating 11 formed on a disk-shaped substrate 10. When voltage is periodically applied to the piezoelectric element 14 by an oscillator (not shown), the dust-proof, light-transmitting member 1 undergoes bending vibration, as shown in FIG. 3(b), conveying dust to the node 15 of vibration.

[5] Imaging Apparatus

The above-described dust-proof, light-transmitting member is suitable as a lowpass filter, a protective member, etc. for imaging devices in electronic imaging apparatuses. The electronic imaging apparatuses, in which the dust-proof, light-transmitting member of the present invention can be used, may be digital cameras such as digital single-lens reflex cameras, imaging apparatuses such as digital video cameras, facsimiles and scanners, etc., though not particularly restricted.

Figure 4:
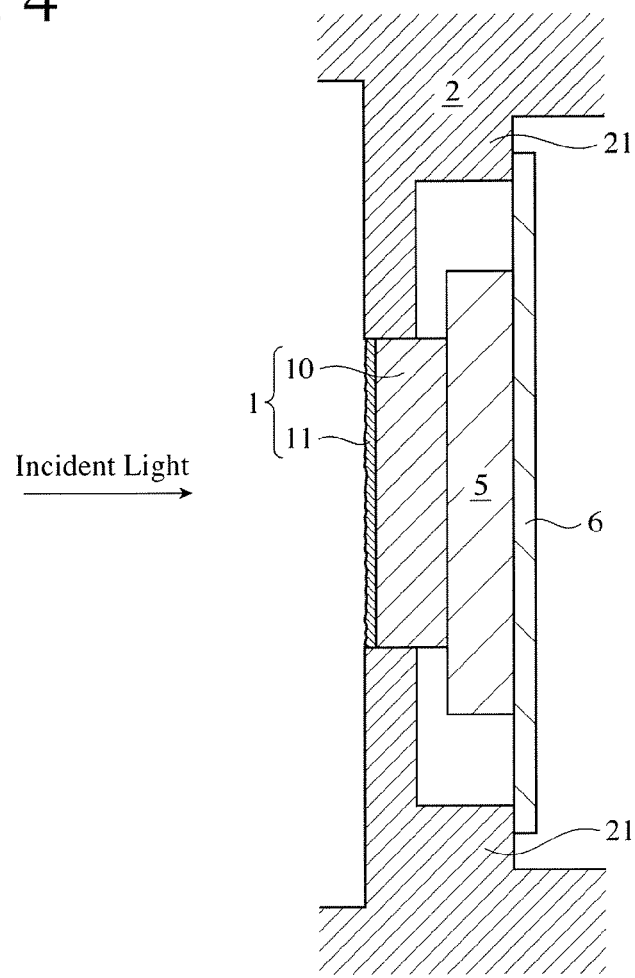
FIG. 4 is a cross-sectional view showing one example of digital cameras, which comprises a lowpass filter constituted by the dust-proof, light-transmitting member of the present invention.

The dust-proof, light-transmitting member is arranged on an imaging device (CCD, CMOS, etc.) on the side of a light-receiving surface. FIG. 4 exemplifies a digital camera comprising a lowpass filter constituted by the dust-proof, light-transmitting member. In this example, CCD 5 is mounted to a support plate 6 fixed to a step 21 of a camera body 2, and a lowpass filter 1 having a dust-proof coating 11 is fit in opening of the camera body 2 in close contact with an a light-receiving surface of CCD 5.

Figure 5:
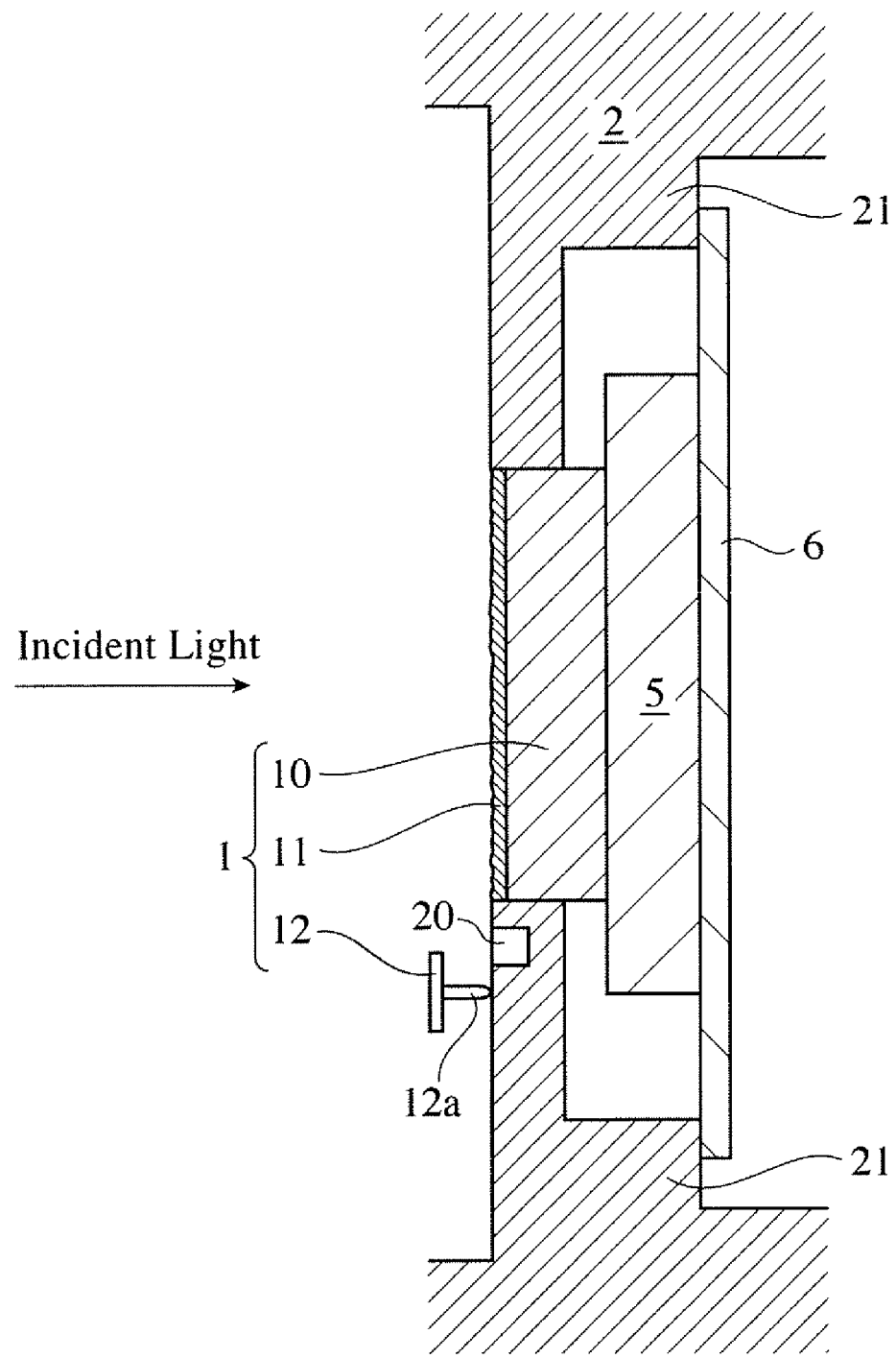
FIG. 5 is a cross-sectional view showing another example of digital cameras, which comprises a lowpass filter constituted by the dust-proof, light-transmitting member of the present invention.

The digital camera shown in FIG. 5 is the same as shown in FIG. 4 except for comprising a wiper 12. The dust-removing function of the wiper 12 is as described above. A sequence and a circuit for moving the wiper 12 is not particularly restricted, and those described in JP 2001-298640A, for instance, may be used.

Figure 6:
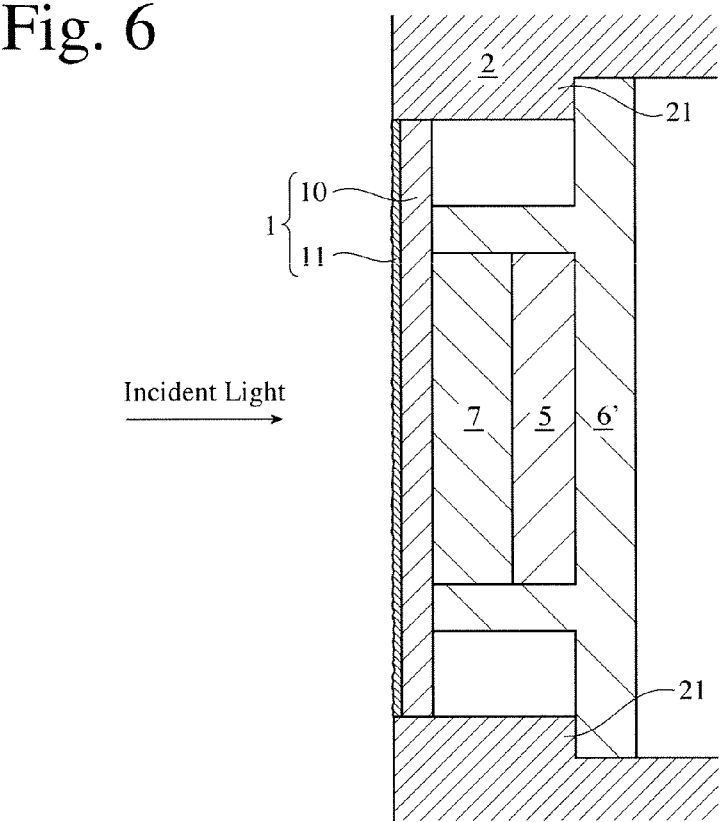
FIG. 6 is a cross-sectional view showing a further example of digital cameras, which comprises a protective member constituted by the dust-proof, light-transmitting member of the present invention.

FIG. 6 exemplifies a digital camera comprising a protective member constituted by the dust-proof, light-transmitting member comprising a dust-proof coating 11 formed on a substrate 10. In this example, a CCD 5 and a lowpass filter 7 are received in this order from the bottom in a box-shaped holder 6' supported by a step 21 of a camera body 2, and the protective member 1 is disposed at the opening of the holder 6'.

Figure 7:
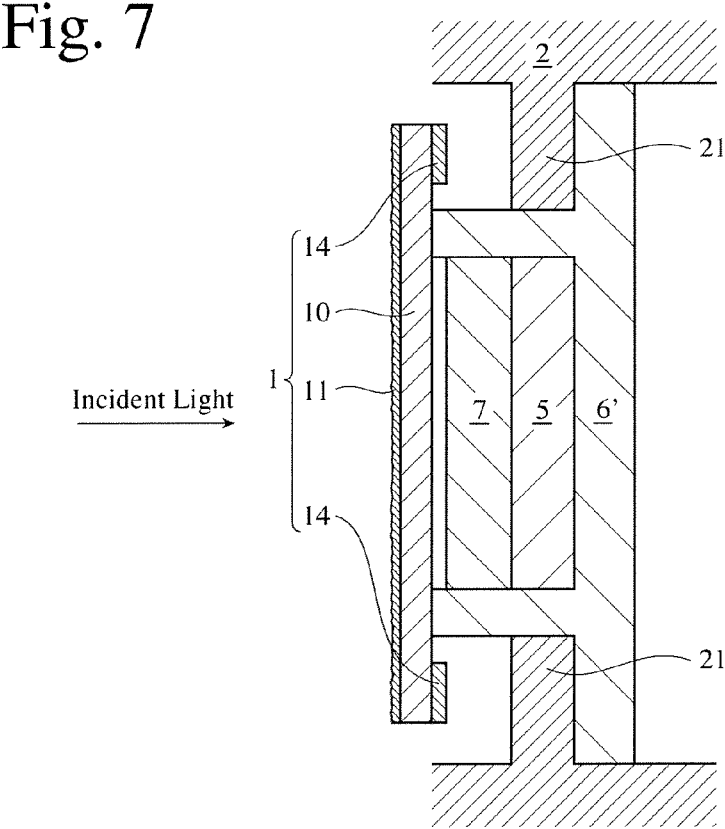
FIG. 7 is a cross-sectional view showing a still further example of digital cameras, which comprises a protective member constituted by the dust-proof, light-transmitting member of the present invention.

The digital camera shown in FIG. 7 is the same as shown in FIG. 6, except that a protective member 1 comprises a piezoelectric element 14. A dust-removing function by the vibration of the piezoelectric element 14 is as described above. A circuit for driving the piezoelectric element 14 is not particularly restricted, and those described in JP 2002-204379A and JP 2003-319222A, for instance, may be used.

Although the present invention has been explained above referring to the attached drawing, it is not restricted thereto, and various modifications may be added unless the scope of the present invention is changed.

The present invention will be explained in further detail by Examples below without intention of restricting the present invention thereto.

Example 1

(1) Formation of Antistatic Layer 50 g of γ-glycidoxy propyltrimethoxysilane, 10 g of ethanol and 15 g of hydrochloric acid (0.01N) were mixed and stirred at room temperature for hydrolysis. The resultant solution was mixed with 50 g of an $Sb_2O_5$ sol having a solid content of 20% by mass ("AMT130" available from Nissan Chemical Industries, Ltd.), and 10 g of ethanol to prepare an antistatic liquid. The resultant antistatic liquid was applied to a lowpass filter (20 mm×30 mm×1.5 mm) constituted by quartz and infrared-absorbing glass by a dipping method, and cured by heating at a temperature of 130° C. for 3 hours to form an antistatic layer having a thickness of 1 μm and surface resistivity of $1×10^{10}$ Ω/square on the lowpass filter.

(2) Formation of Petal-Shaped Alumina Layer 200 g of aluminum sec-butoxide was mixed with 700 g of sufficiently dehydrated isopropyl alcohol in a low-humidity atmosphere, sufficiently stirred at room temperature, mixed with 105 g of ethyl acetoacetate, and stirred for 3 hours. At the same time, 300 g of isopropyl alcohol was mixed with 45 g of water and stirred in the same atmosphere. The resultant aluminum sec-butoxide solution was mixed with an aqueous isopropyl alcohol solution, stirred at room temperature for 24 hours to prepare a coating liquid. The resultant coating liquid was applied to the antistatic-layer-coated lowpass filter by a dipping method, and cured by heating at a temperature of 150° C. for 2 hours to provide the antistatic-layer-coated lowpass filter with a transparent alumina gel coating. The resultant alumina-gel-coated lowpass filter was immersed in boiled distilled water for 10 minutes, and dried by heating at a temperature of 150° C. for 30 minutes to provide the antistatic-layer-coated lowpass filter coated on both surfaces with petal-shaped alumina layers [three-dimensional average surface roughness (SRa): 18.0 nm, maximum roughness height difference (P-V): 180.1 nm, and specific surface area ($S_R$): 1.23].

(3) Formation of Water-Repellent Layer

A commercially available fluorine-containing water repellent ("OF-110" available from Canon Optron, Inc.) was evaporated by a resistance-heating method, to form a water-repellent layer (thickness: 0.05 μm, refractive index: 1.42) on each petal-shaped alumina layer on the lowpass filter. The lowpass filter thus obtained had a water-repellent layer, a petal-shaped alumina layer and an antistatic layer in this order from the outermost surface.

Figure 8:
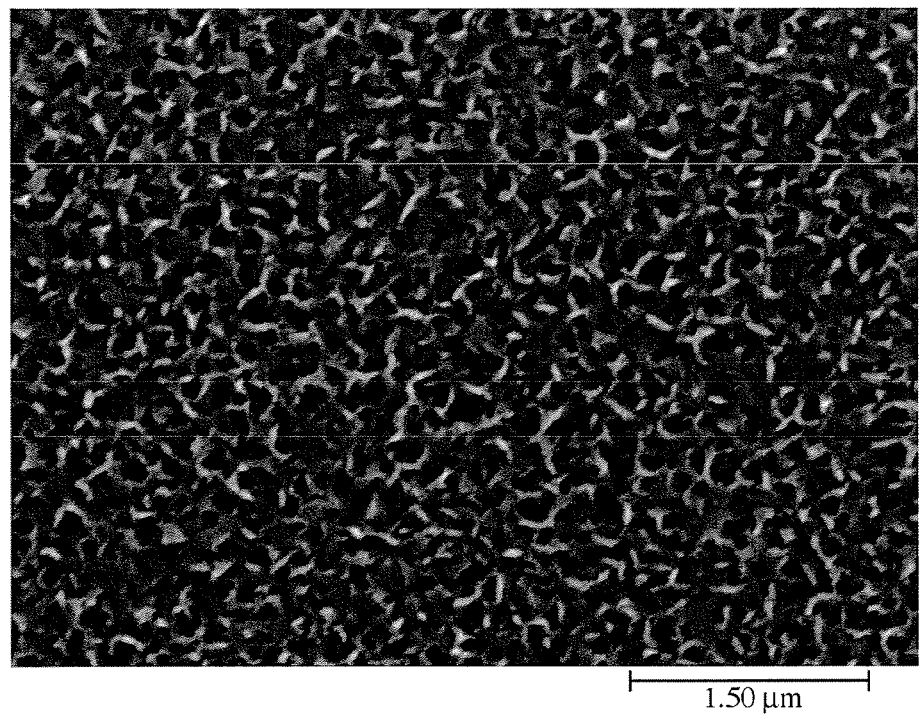
FIG. 8 is a photomicrograph (23,000 times) showing the lowpass filter surface of Example 1.
Figure 9:
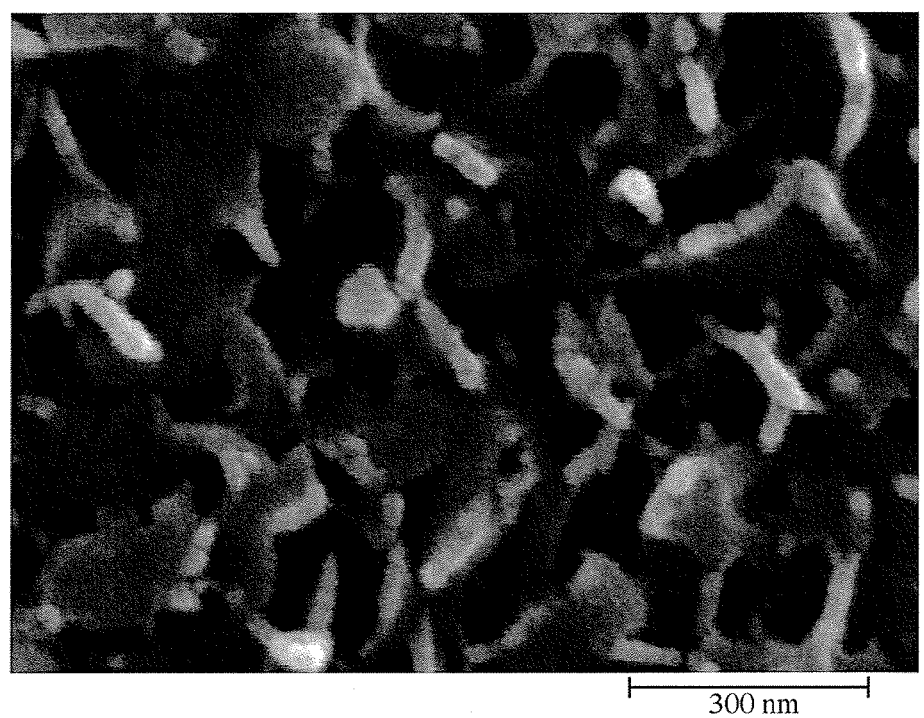
FIG. 9 is a higher-magnification photomicrograph (113,000 times) showing part of the lowpass filter surface of FIG. 1.

The water-repellent surface of the resultant lowpass filter was observed by SEM. FIG. 8 (23,000 times) and FIG. 9 (113,000 times) are its SEM photographs. It is clear from FIGS. 8 and 9 that the dust-proof coating had roughness constituted by an irregular arrangement of fine petal-shaped protrusions each as long as about several tens of nanometers to 100 nm, and groove-shaped recesses of about several tens of nanometers to 200 nm irregularly existing between the petal-shaped protrusions. Each outermost surface of the resultant lowpass filter had SRa of 15.5 nm, the maximum roughness height difference (P-V) of 174.1 nm, a specific surface area ($S_R$) of 1.19, and a pure water contact angle of 140°.

Example 2

A lowpass filter having a water-repellent layer (thickness: 0.05 μm, refractive index: 1.38), a petal-shaped alumina layer and an antistatic layer was produced in the same manner as in Example 1, except that an ITO layer (thickness: 0.1 μm, surface resistivity: $1 \times 10^4$ Ω/square) was formed as the antistatic layer by a vapor deposition method. Each outermost surface of the resultant lowpass filter had SRa of 16.8 nm, the maximum roughness height difference (P-V) of 161.8 nm, a specific surface area ($S_R$) of 1.19, and a pure water contact angle of 140°.

Example 3

An antistatic layer and a petal-shaped alumina layer [three-dimensional average surface roughness (SRa): 13.5 nm, maximum roughness height difference (P-V): 129.9 nm, and specific surface area ($S_R$): 1.18] were formed on each surface of a disk (thickness: 0.5 mm, diameter: 30 mm) made of borosilicate crown glass (BK7) as a substrate in the same manner as in Example 1. A commercially available fluorine-containing surface-treating agent ("Novec EGC-1720" available from Sumitomo 3M Ltd.) was applied to each petal-shaped alumina layer of the coated glass substrate by a dipping method, to form a water-repellent layer (thickness: 0.03 μm, refractive index: 1.34). As shown in FIG. 7, a flat, planar, annular piezoelectric element 14 was attached to a rear surface of the protective member 1. The outermost surface of the protective member had SRa of 12.3 nm, the maximum roughness height difference (P-V) of 122.8 nm, a specific surface area ($S_R$) of 1.15, and a pure water contact angle of 150°.

Example 4

A piezoelectric-element-attached protective member having an antistatic layer and a petal-shaped alumina layer [three-dimensional average surface roughness (SRa): 16.2 nm, maximum roughness height difference (P-V): 158.8 nm, and specific surface area ($S_R$): 1.29] on both surfaces was produced, in the same manner as in Example 3 except for forming no water-repellent layer. The outermost surface of the protective member was the petal-shaped alumina layer, which had a pure water contact angle of 5°.

Example 5

A piezoelectric-element-attached protective member having a petal-shaped alumina layer [three-dimensional average surface roughness (SRa): 17.9 nm, maximum roughness height difference (P-V): 165.3 nm, specific surface area ($S_R$): 1.31, pure water contact angle: 5°] on both surfaces was produced, in the same manner as in Example 3 except for forming no antistatic layer and no water-repellent layer.

Comparative Example 1

$SiO_2$ and $TiO_2$ were alternately vapor-deposited on a quartz-made lowpass filter to form an anti-reflection layer (layer structure: $SiO_2/TiO_2/SiO_2/TiO_2/SiO_2$, thickness: 0.3 μm), and a water-repellent layer (thickness: 0.05 μm) made of OF-110 was formed thereon by a resistance-heating method. Each outermost surface of the resultant water-repellent lowpass filter had SRa of 0.4 nm, the maximum roughness height difference (P-V) of 5 nm, a specific surface area ($S_R$) of 1.0, and a pure water contact angle of 107°.

Comparative Example 2

$SiO_2$ and $TiO_2$ were alternately vapor-deposited on a disk (thickness: 0.5 mm, diameter: 30 mm) made of borosilicate crown glass (BK7) to form an anti-reflection layer (layer structure: $SiO_2/TiO_2/SiO_2/TiO_2/SiO_2$, thickness: 0.3 μm), and a water-repellent layer made of Novec EGC-1720 was formed thereon by a dipping method. As shown in FIG. 7, a flat, planar, annular piezoelectric element 14 was attached to a rear surface of the protective member 1. Each outermost surface of the resultant protective member had SRa of 0.4 nm, the maximum roughness height difference (P-V) of 5 nm, a specific surface area ($S_R$) of 1.0, and a pure water contact angle of 110°.

The SRa, maximum roughness height difference (P-V), specific surface area ($S_R$), and pure water contact angle of the lowpass filter and protective member of each Example and Comparative Example are shown in Table 1.

The lowpass filters produced in Examples 1, 2 and Comparative Example 1, and the protective members produced in Examples 3-5 and Comparative Example 2 (hereinafter referred to as "samples" below) were examined with respect to particle adhesion resistance by the following method. The results are shown in Table 1.

(1) Number of Particles Adhered

Each sample was vertically placed in a cylindrical vessel having a volume of 1,000 cm³ and a diameter of 95 mm. 0.01 mg of silex (main component: $SiO_2$, specific gravity: 2.6 g/cm³) classified to have a particle size distribution of 20-30

μm was uniformly scattered in the vessel, and the number of silex particles adhered to the sample surface was counted after left to stand for 1 hour. This measurement was conducted at a temperature of 25° C. and relative humidity (RH) of 30%, 50% and 80%, respectively.

(2) Adhesion Force of Particles

With respect to Examples 3-5 and Comparative Example 2, silex particles were attached to each protective member as described above, and voltage was then periodically applied to the piezoelectric element to measure a force (N) necessary for repulsing all silex particles. A force (N') for each silex particle calculated from the above measured force (N) was divided by gravity applied to each silex particle in a 1-G gravitational field to determine a particle adhesion force (G). Incidentally, the gravity applied to each silex particle was $1.07 \times 10^{-10}$ N, assuming that each silex particle was a true sphere having a diameter of 20 μm and a specific gravity of 2.6 g/cm$^3$.

TABLE 1

| No. | Outermost Surface | | | |
|---|---|---|---|---|
| | SRa (nm) | $S_R$ | P-V (nm) | Contact Angle[1] (°) |
| Example 1 | 15.5 | 1.19 | 174.1 | 140 |
| Example 2 | 16.8 | 1.19 | 161.8 | 140 |
| Example 3 | 12.3 | 1.15 | 122.8 | 150 |
| Example 4 | 16.2 | 1.29 | 158.8 | 5 |
| Example 5 | 17.9 | 1.31 | 165.3 | 5 |
| Comparative Example 1 | 0.4 | 1.0 | 5 | 107 |
| Comparative Example 2 | 0.4 | 1.0 | 5 | 110 |

| No. | Number of Silex Particles Adhered at RH | | | Silex Adhesion Force (G) at RH | | |
|---|---|---|---|---|---|---|
| | 30% | 50% | 80% | 30% | 50% | 80% |
| Example 1 | 0 | 3 | 4 | — | — | — |
| Example 2 | 0 | 1 | 1 | — | — | — |
| Example 3 | 0 | 0 | 2 | — | — | 520 |
| Example 4 | 1 | 11 | 47 | 520 | 3,200 | 8,500 |
| Example 5 | 18 | 27 | 33 | 2,200 | 4,800 | 8,500 |
| Comparative Example 1 | 88 | 105 | 150 | — | — | — |
| Comparative Example 2 | 74 | 90 | 209 | 17,100 | 20,300 | 24,700 |

Because the samples of Examples 1-5 having petal-shaped alumina layers had fine roughness on the outermost surface, they did not have many silex particles adhered, exhibiting excellent resistance to the adhesion of foreign matter. Among them, because the samples of Examples 1-3 had water-repellent layers on the outermost surface, they particularly exhibited excellent resistance to the adhesion of foreign matter. The number of silex particles adhered was much larger in the samples of Comparative Examples 1 and 2 having no petal-shaped alumina layers than those of Examples 1-5. Particularly, the sample of Comparative Example 2 was larger than those of Examples 4 and 5 in the silex adhesion force. It was thus found that the dust-proof, light-transmitting member of the present invention having a petal-shaped alumina layer had an effectively reduced foreign matter adhesion force.

EFFECT OF THE INVENTION

Dust particles attached to the dust-proof, light-transmitting member of the present invention having a dust-proof coating having fine roughness on the surface have reduced intermolecular force and attaching force by contact charging. The dust-proof, light-transmitting member of the present invention thus has excellent foreign matter adhesion resistance, needing no mechanical dust-removing means. Accordingly, it contributes to the reduction of cost, weight and electric consumption of imaging apparatuses. Particularly, the dust-proof, light-transmitting member having an antistatic layer can reduce an electrostatic attraction force and an electrostatic image force between dust particles and the dust-proof coating of the dust-proof, light-transmitting member, resulting in higher foreign matter adhesion resistance. Further, the dust-proof, light-transmitting member having a water-repellent/oil-repellent layer on the outermost surface can reduce a liquid-bridging force between dust particles and the dust-proof, light-transmitting member, resulting in higher foreign matter adhesion resistance. The dust-proof, light-transmitting member of the present invention has excellent anti-reflection characteristics because of the fine roughness of the dust-proof coating.

The present disclosure relates to subject matter contained in Japanese Patent Application No. 2006-921 filed on Jan. 5, 2006, which is expressly incorporated herein by reference in its entirety.

What is claimed is:

1. A dust-proof, light-transmitting member disposed on a light-receiving surface of an imaging device, comprising a light-transmitting substrate, at least a light-entering surface of which is provided with a dust-proof coating having fine roughness on the surface, comprising at least one selected from alumina, zinc oxide or zinc hydroxide, wherein an antistatic layer is formed under said dust-proof coating and a water-repellant layer with or without oil repellency is formed on said dust-proof coating, wherein said dust-proof, light-transmitting member has spectral reflectance of 3% or less to visible light.

2. The dust-proof, light-transmitting member according to claim 1, wherein the roughness of said dust-proof coating is constituted by large numbers of fine petal-shaped protrusions irregularly distributed with groove-shaped recesses existing therebetween.

3. The dust-proof, light-transmitting member according to claim 1, wherein said antistatic layer has surface resistivity of $1 \times 10^{14}$ Ω/square or less.

4. The dust-proof, light-transmitting member according to claim 1, wherein said a water-repellent layer with or without oil repellency has a thickness of 0.4-100 nm.

5. The dust-proof, light-transmitting member according to claim 1, wherein said outermost surface has three-dimensional average surface roughness of 1-100 nm.

6. The dust-proof, light-transmitting member according to claim 1, wherein the roughness of said outermost surface has the maximum height difference of 5-1,000 nm.

7. The dust-proof, light-transmitting member according to claim 1, wherein said outermost surface has a specific surface area of 1.05 or more.

8. The dust-proof, light-transmitting member according to claim 1, wherein it comprises a mechanical dust-removing means.

9. A lowpass filter constituted by the dust-proof, light-transmitting member recited in claim 1.

10. A protective member for an imaging device, which is constituted by the dust-proof, light-transmitting member recited in claim 1.

11. An imaging apparatus provided with the lowpass filter recited in claim 9.

12. An imaging apparatus provided with the protective member recited in claim 10.

* * * * *